United States Patent
Dennis et al.

(10) Patent No.: US 7,353,376 B2
(45) Date of Patent: Apr. 1, 2008

(54) METHOD AND SYSTEM FOR IMPLEMENTING FULL BBS (BIOS BOOT SPECIFICATION) FUNCTIONALITY WITH A SINGLE DEVICE LIST

(75) Inventors: Lowell Dennis, Pflugerville, TX (US); Charles Marslett, Pflugerville, TX (US); Pete Woytovech, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 347 days.

(21) Appl. No.: 11/132,780

(22) Filed: May 19, 2005

(65) Prior Publication Data

US 2006/0265580 A1    Nov. 23, 2006

(51) Int. Cl.
*G06F 15/177* (2006.01)

(52) U.S. Cl. .................. 713/1; 713/2; 710/1; 710/8; 710/9; 710/10; 710/11; 710/12; 710/13; 710/14; 710/15

(58) Field of Classification Search .............. 713/1, 713/2; 710/1, 8–15
See application file for complete search history.

(56) References Cited

U.S. PATENT DOCUMENTS

| 6,292,890 | B1 | 9/2001 | Crisan | 713/2 |
| 6,317,828 | B1 | 11/2001 | Nunn | 713/2 |
| 6,721,883 | B1* | 4/2004 | Khatri et al. | 713/2 |
| 6,988,194 | B2 | 1/2006 | Nunn et al. | 713/2 |
| 6,990,685 | B1 | 1/2006 | Christensen et al. | 726/34 |
| 7,111,202 | B2 | 9/2006 | Cagle et al. | 714/36 |
| 7,174,446 | B2* | 2/2007 | Dennis et al. | 713/1 |
| 2004/0078679 | A1 | 4/2004 | Cagle et al. | 714/36 |
| 2005/0027977 | A1 | 2/2005 | Taylor | 713/2 |
| 2005/0038985 | A1 | 2/2005 | Taylor | 713/2 |
| 2005/0216715 | A1* | 9/2005 | Matheny et al. | 713/1 |

OTHER PUBLICATIONS

Compaq Computer Corporation, Phoenix Technologies Ltd., Intel Corporation, "BIOS Boot Specifications," Version 1.01, Jan. 11, 1996.

* cited by examiner

*Primary Examiner*—Abdelmoniem Elamin
(74) *Attorney, Agent, or Firm*—O'Keefe, Egan, Peterman & Enders LLP

(57) ABSTRACT

Methods and systems are disclosed for single list BBS implementations that allow for significant configurability and ease of use improvements. BCV devices are included as individual entries in the IPL list so that intermixing of devices of different device types is freely allowed. As such, users are provided a simplified and more powerful configuration interface through which to select the order of boot devices. In addition, a drive swizzler or hard drive link handler is included to provide an interface between the INT 13 link chain for hard drives and the operating system.

18 Claims, 8 Drawing Sheets

METHOD AND SYSTEM FOR IMPLEMENTING FULL BBS (BIOS BOOT SPECIFICATION) FUNCTIONALITY WITH A SINGLE DEVICE LIST

TECHNICAL FIELD OF THE INVENTION

This invention relates to the techniques for handling system boot processes and device handling procedures for information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some information handling systems utilize an industry standard BIOS (basic input output system) Boot Specification (BBS) for booting up the system. The BBS is an industry standard originally sponsored by Compaq Computer Corporation, Phoenix Technologies Ltd., and Intel Corporation to define an initialization process through which operating system software is loaded into system memory or storage so that the system can operate application software. In part, the BBS defines how bootable devices are handled by computer systems. One version of the BBS is Version 1.01 dated Jan. 11, 1996, which is hereby incorporated by reference in its entirety.

With respect to handling different bootable devices in a system, the industry standard BBS advocates the use of two separate device lists. A first list is used to keep track of and prioritize the device from which the initial program load should occur (Initial Program Load (IPL) list), and a second list is used to keep track of the connection vectors for certain types of bootable devices (Boot Connection Vector (BCV) list). IPL devices are processed in sequence looking for an operating system to launch. One entry in the IPL list indicates when the BCV list is to be processed. BCV devices are hard drives (IDE, SATA, SCSI, RAID, etc.) and any other device that can emulate a hard drive (like a USB key drive). BCV devices are different from IPL devices in that their boot connection vector are called to link them into the hard disk chain, which is typically based upon system interrupt 13 (INT 13). The order in which BCV devices are linked into the INT 13 chain is significant in that it determines the drive number (or numbers) the device will use.

One significant problem caused by this two-list implementation provided in the BBS standard is its complexity. This complexity makes the two-list implementation difficult for the majority of the user community to grasp and relatively inflexible in that IPL and BCV devices can not be intermingled.

Most BIOS vendors use a multiple list implementation in some form. Some BIOS vendors stick with IPL and BCV lists as set forth in the BBS standard, while others actually allow most or all IPL entries to invoke separate sub-lists. For example, an IPL entry of "Network Device" processes a list containing only NICs (network interface cards) and LOMs (LAN on motherboard devices); and an IPL entry of "Removable Devices" would process a list of floppy drives, ZIP drives, and LS120 drives (high-capacity removable disk drive).

FIG. 5A (prior art) is a block diagram for a two-list implementation of the BBS. The first list is IPL list 502, and the second list is BCV list 504. The IPL list 502 includes an ordered list of device types that will be initialized as the system boots up, and the order determines the actual order in which the devices will be initialized by the system. As shown in FIG. 5A (prior art), the IPL list 502 includes floppy drive 510, CDROM drive 512, hard drives 514, and NIC (network interface card) 518. The BCV list 504 includes an ordered list of hard drive devices, and the order determines the order in which the devices will be linked in the INT 13 chain and accessed in an effort to boot the system. In the embodiment depicted in FIG. 5A (prior art), the hard drive list includes three bootable hard drives and three USB (universal serial bus) drives. In order, these are a first hard drive (DRIVE 1) 522, a second hard drive (DRIVE 2) 524, a third hard drive (DRIVE 3) 526, a first USB drive (USB 1) 532, and a second USB drive (USB 2) 534. Both the IPL list 502 and the BCV list 504 are configurable by the user such that the order of the device types within the IPL list 502 can be selected and such that the order of the INT 13 devices in the BCV list 504 can be selected. Although this two-list approach BBS provides some configurability, one significant limitation is that devices are forced into a signal slot in the IPL list 502 based upon their device type, and devices of different device types can not be intermixed. As depicted, the boot order as defined by the IPL list 502 is: (1) floppy drive 510, (2) CDROM drive 512, (3) hard drives as controlled by BCV list 504, and (5) NIC 518. Once one of these devices is successful in booting the system, the boot process stops.

As another example, the BIOS for portable computer systems from DELL have previously used a single list for the boot process. However, this BIOS processing only allows for a limited and fixed set of BCV devices (integrated HD, module bay HD, docking bay HD, and USB HD). Although requiring a fixed set of BCV devices may work for portable computers, it does not work well for desktop systems, server systems, or other more complex systems, as the potential configuration of BCV devices is virtually endless, making it impractical to provide a fixed list for every possible permutation of IPL and BCV devices.

FIG. 5B (prior art) provides a block diagram for a prior technique for providing intermixed device types in IPL lists where the configuration options were limited due to the nature of the system involved. With this prior technique, a small number of fixed configurations were presented as fixed IPL lists. As shown, fixed IPL LIST 1 550 has an ordered list including floppy drive 510, CDROM drive 512, hard drive 1 522, NIC 518, and hard drive 2 524. Fixed IPL LIST 2 560 has an ordered list including floppy drive 510, NIC 518, hard drive 1 522, CDROM drive 512, and hard drive 2 524. While these fixed IPL lists provided some degree of added flexibility in terms of intermixing device types in the IPL list, they do not allow a user to freely configure boot options. In addition, as stated above, this technique is dependent upon a limited number of possible hardware configurations and is not practical for systems having a wide variety of potential configuration options and bootable device types.

SUMMARY OF THE INVENTION

The present invention provides systems and methods for single list BBS implementations that allow for significant configurability and ease of use improvements. In particular, BCV devices are included as individual entries in the IPL list so that intermixing of devices of different device types is freely allowed. As such, users are provided a simplified and more powerful configuration interface through which to select the order of boot devices. In addition, a drive swizzler or hard drive link handler is included to provide an interface between the INT 13 link chain for hard drives and the operating system.

In one embodiment, the present invention is a method for utilizing a single BIOS boot specification (BBS) list in an information handling system including analyzing each installed bootable device in an information handling system during system boot to identify each device as a BCV (boot connection vector) device or as a non-BCV device, determining for each BCV device a number of drives supported by that BCV device and placing the BCV device within a BCV link, forming a single BBS list including BCV devices and non-BCV devices, booting the system according to a device order set forth in the single BBS list, and, if a current boot device is a BCV device, utilizing a drive swizzler as needed to control a link designation for the boot device to make the boot device appear to be a first device in the BCV link to an operating system for the system. As described below, other features and variations can be implemented, if desired, and related systems can be utilized, as well.

In another embodiment, the present invention is an information handling system having a single BIOS boot specification (BBS) list including a central processing unit (CPU), a plurality of bootable devices, and a BIOS in communication with the CPU and the plurality of bootable devices, the BIOS being configured to operate during initialization of the information handling system to analyze each of the installed bootable devices during system boot to identify each device as a BCV (boot connection vector) device or as a non-BCV device, to determine for each BCV device a number of drives supported by that BCV device and place the BCV device within a BCV link, to form a single BBS list including BCV devices and non-BCV devices, to boot the system according to a device order set forth in the single BBS list, and, if a current boot device is a BCV device, to utilize a drive swizzler as needed to control a link designation for the boot device to make the boot device appear to be a first device in the BCV link to an operating system for the system. As described below, other features and variations can be implemented, if desired, and related methods can be utilized, as well.

In another embodiment, the present invention is a BIOS (basic input output system) for an information handling system including a boot process routine including a BIOS boot specification (BBS) list build process configured to analyze each of the installed bootable devices during system boot to identify each device as a BCV (boot connection vector) device or as a non-BCV device within a single BBS list, a BCV link process configured to determine for each BCV device a number of drives supported by that BCV device and to place the BCV device within a BCV link, and a device boot process configured to boot the system according to a device order set forth in the single BBS list, and if a current boot device is a BCV device, to utilize a drive swizzler as needed to control a link designation for the boot device to make the boot device appear to be a first device in the BCV link to an operating system for the system. As described below, other features and variations can be implemented, if desired, and related methods can be utilized, as well.

DESCRIPTION OF THE DRAWINGS

It is noted that the appended drawings illustrate only exemplary embodiments of the invention and are, therefore, not to be considered limiting of its scope, for the invention may admit to other equally effective embodiments.

DETAILED DESCRIPTION OF THE INVENTION

Figure 1:
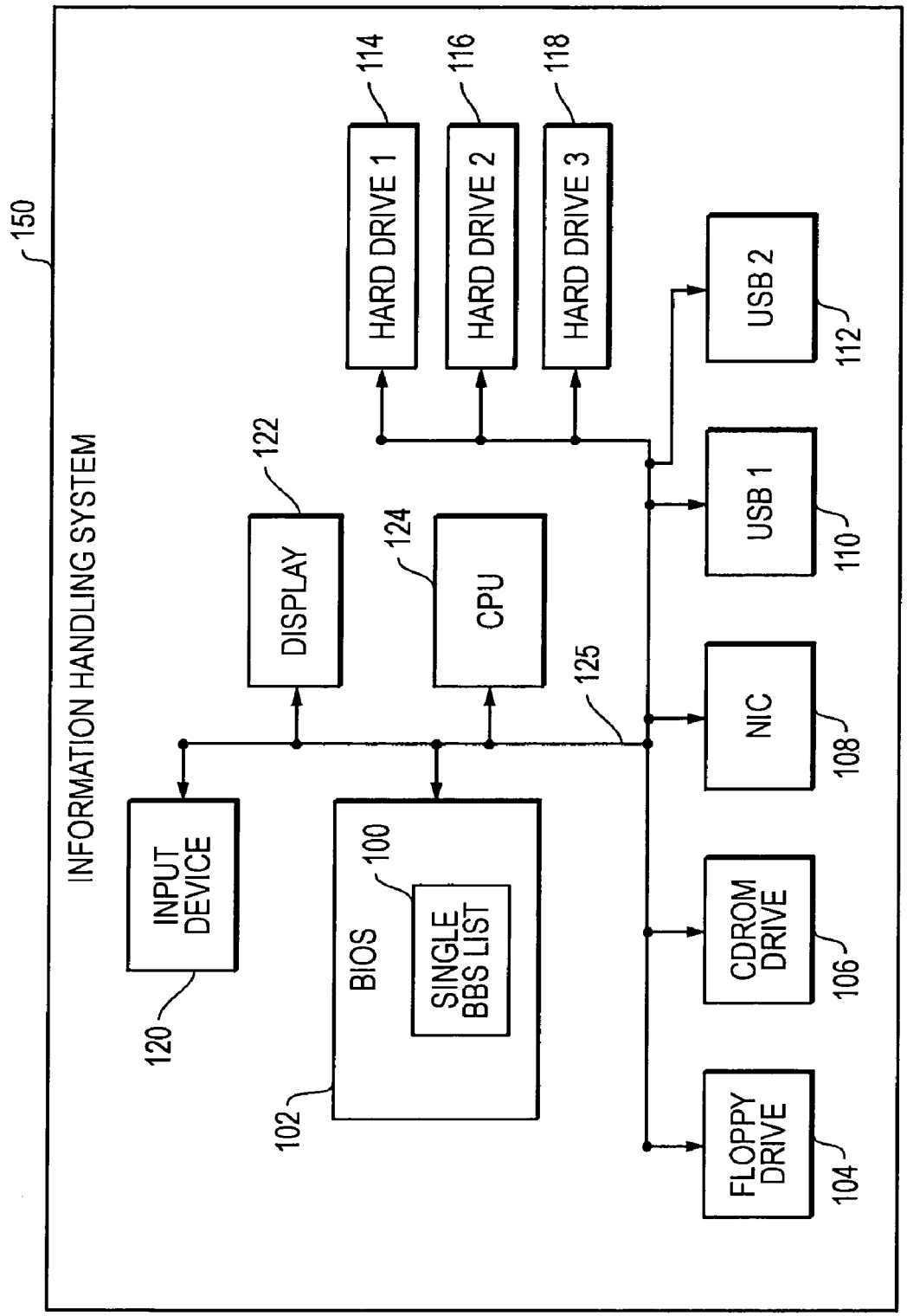
FIG. 1 is a block diagram for an information handling system including a single BBS list according to the present invention.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a server computer system, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

The present invention provides systems and methods for single list BBS implementations for information handling systems that allow for significant configurability and ease of use improvements. In part, the present invention allows IPL and BCV devices to be properly handed in one list thereby decreasing the complexity of the boot process. In addition, the present invention allows the user interface in setup to be drastically simplified while adding increased flexibility and diversity in allowing IPL and BCV devices to be intermingled in whatever order the user desires.

By employing and managing a single BBS list, the present invention allows IPL and BCV devices to be maintained together such that the same features and controls that are currently available in the BIOS for standard two-list implementations can be applied to the single BBS list. In addition, prior BIOS techniques can be made available, such as, for example, adding new devices to the end of the list and labeling devices as "dormant" to be placeholders for devices that have been removed and that may be reinserted into the system in the future. In addition, like devices can still be differentiated, and priority and state of these devices can be maintained from boot to boot.

In order to unify the IPL and BCV lists, the BIOS according to the present invention keeps track of which devices are true IPL devices, and which devices are not. This differentiation is significant in three primary places. The first difference is in the building of the hard drive chain (INT 13$h$). Once the boot list has been reconciled, the entire list is scanned and the boot connection vector code for each BCV device is called in the order that it appear in the list. The second difference is in the actual booting of the devices. To boot an IPL device, the BIOS simply passes control to the desired device's boot entry vector (BEV). For BCV devices in PC computer systems, INT 13$h$ is used to load the device's boot sector and then jump to it. The last difference is in handling a boot to an arbitrary device. During POST (power on system test), the user may opt to boot in an atypical one shot way, for example, by pressing an appropriate function key on the keyboard, such as F12. When the BIOS detects this condition, it displays the list of available boot devices to the user, and allows the user to select one. If the selected device is an IPL device, the boot processing is the same as a normal boot. However, if the selected device, is a BCV device, the boot processing is drastically different. In PC systems, the BCV boot drive must be drive 80$h$ (C:). So if the user chooses a BCV device whose drive number is something other than 80$h$, the INT 13 drive chain must be altered so that the selected drive becomes drive 80$h$. This means that BCV devices that were originally in the INT 13 chain before the selected drive must also have their drive numbers altered, for example, each being increased by 1. Because it would be very difficult to unlink and relink the INT 13 chain, the BIOS takes over INT 13 and performs the remapping of drives by itself. This remapping is what is commonly called drive "swizzling." Because a BCV device can actually consume more than one drive number, the BIOS keeps track of each BCV device's base drive number and the number of drives it supports in order to provide the ability to boot to an arbitrary BCV.

Figure 2A:
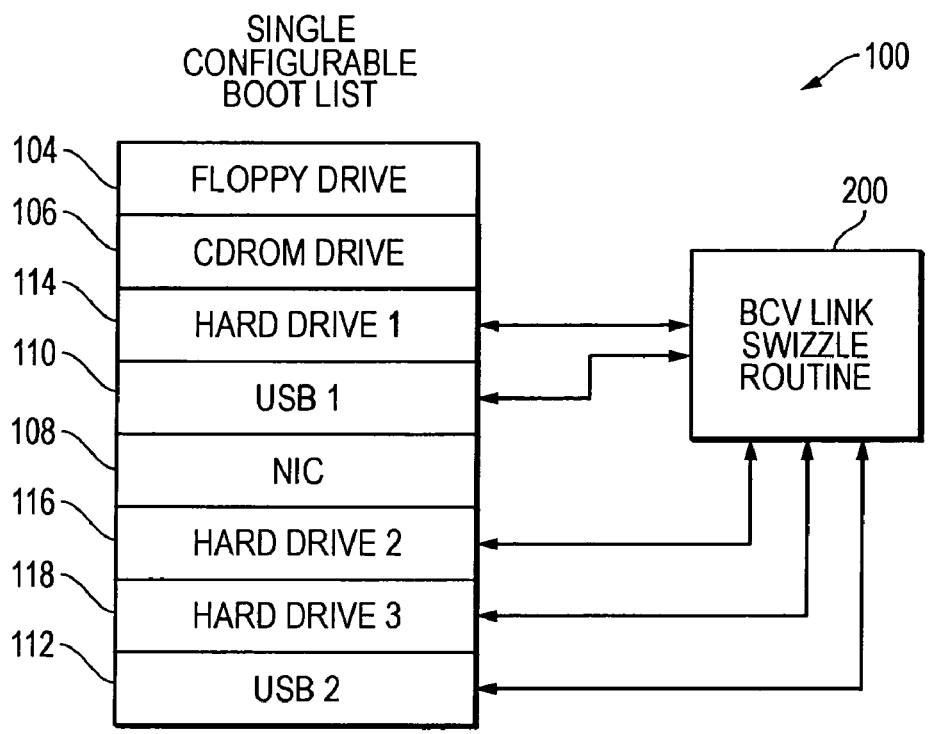
FIG. 2A is a block diagram for an example single configurable boot list including a swizzle routine according to the present invention.
Figure 2B:
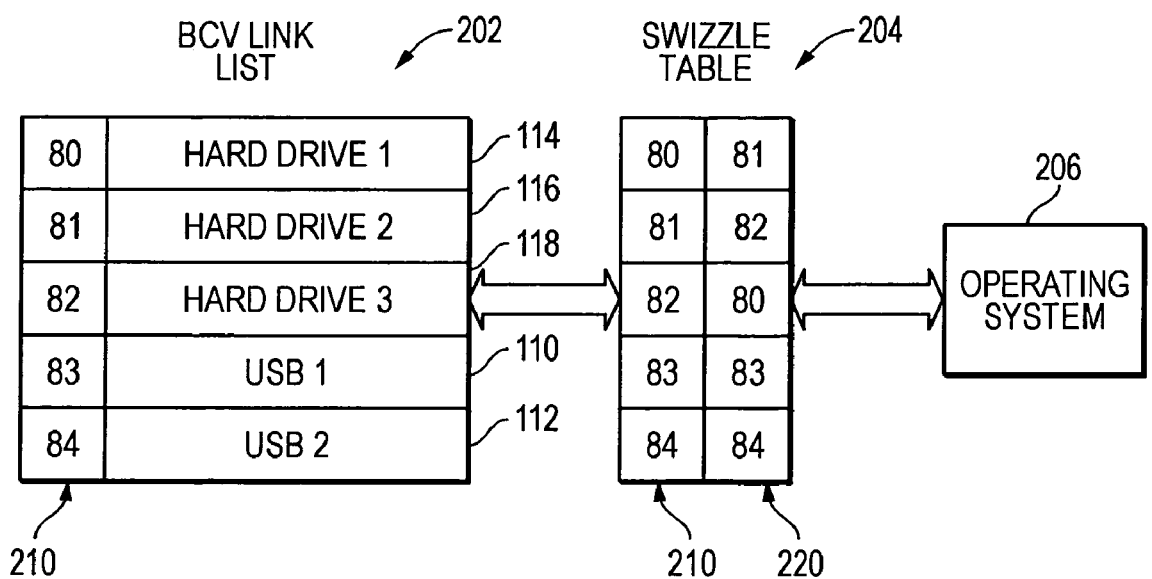
FIG. 2B is a block diagram for swizzling the numbers assigned bootable devices in a BCV list according to the present invention.
Figure 3:
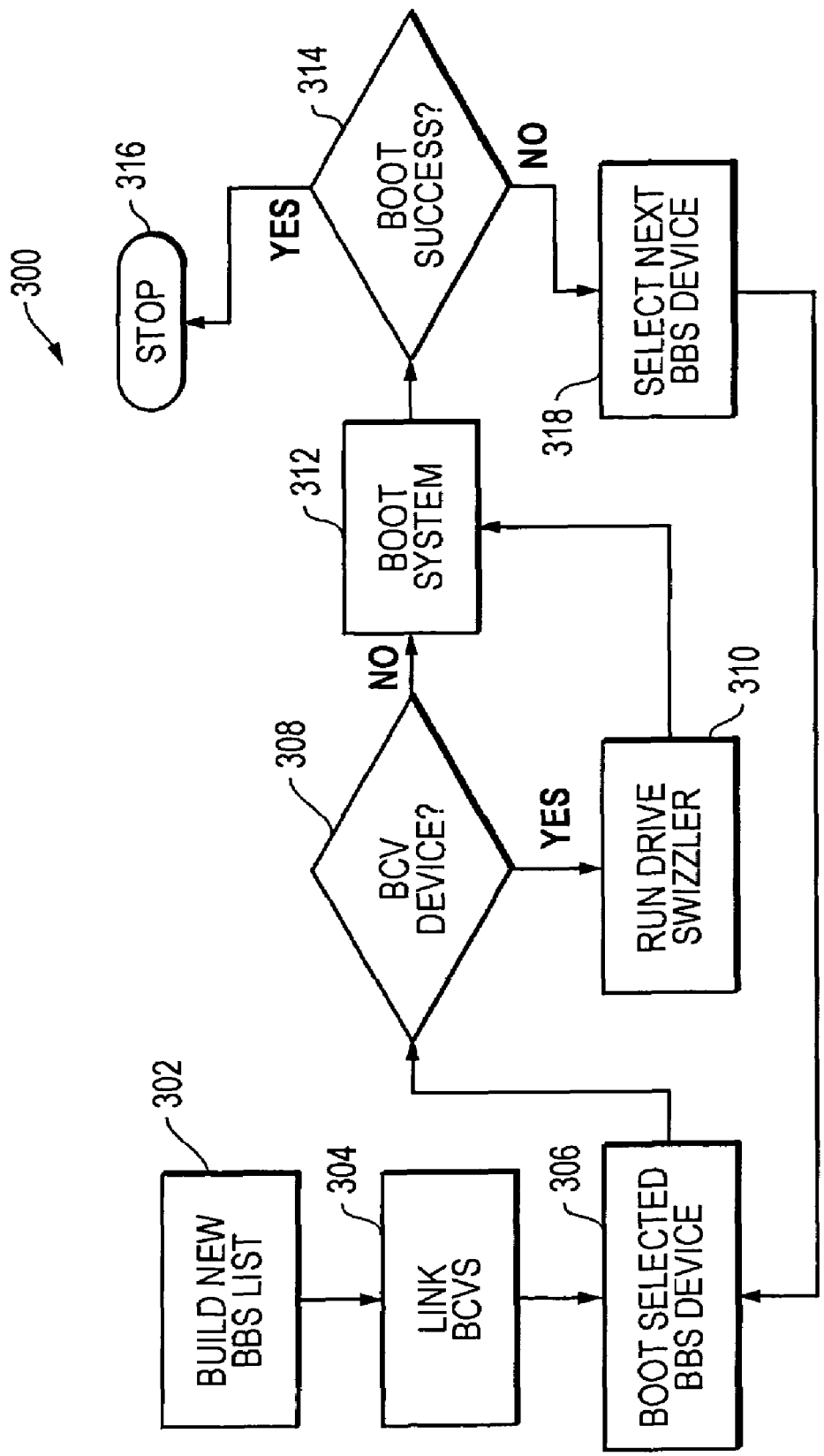
FIG. 3 is a flow diagram for drive number swizzling according to the present invention.

Example embodiments for the present invention will now be discussed with respect to the drawings. FIG. 1 provides a block diagram of an information handling system including the single boot list. FIGS. 2A, 2B and 3 provide example BBS lists and drive swizzling procedures. FIGS. 4A-D provide example process flow diagrams for single BBS list processing, according to the present invention.

FIG. 1 is a block diagram for an information handling system 150 including a single boot list 100 according to the present invention. In the embodiment depicted, the information handling system 150 includes a central processing unit (CPU) 124, BIOS (basic input output system) 102 with a single boot list 100, an input device 120 and a display 122. In addition, the information handling system 150 includes a number of devices that could potentially be used to boot the system. These devices include floppy drive 104, CDROM drive 106, network interface card (NIC) 108, a first USB (universal serial bus) drive (USB 1) 110, a second USB drive (USB 2) 112, a first hard drive (HARD DRIVE 1) 114, a second hard drive (HARD DRIVE 2) 116, and a third hard drive (HARD DRIVE 3) 118. Interconnection 125 connects the devices and the other blocks within the information handling system 150 and represents one or more busses and related connection circuitry that allows communications among these elements of the information handling system 150.

FIG. 2A is a block diagram for an example single configurable boot list 100 including a swizzle routine 200 according to the present invention. The single configurable boot list 100 includes a plurality of ordered slots designating the order in which devices will be utilized to boot the information handling system 150. In the embodiment depicted, the order has been configured as follows: (1) floppy drive 104, CDROM drive 106, the first hard drive (HARD DRIVE 1) 114, the first USB drive (USB 1) 110, network interface card (NIC) 108, the second hard drive (HARD DRIVE 2) 116, the third hard drive (HARD DRIVE 3) 118, and the second USB drive (USB 2) 112. For the drives that will be linked in the INT 13 chain, a connection is provided to the swizzle routine 200, if one of these devices is selected as the boot device.

FIG. 2B is a block diagram for swizzling the numbers assigned the bootable devices in a BCV list according to the present invention. In the example depicted, the BCV list 202 includes first hard drive (HARD DRIVE 1) 114, the second hard drive (HARD DRIVE 2) 116, the third hard drive (HARD DRIVE 3) 118, the first USB drive (USB 1) 110, and the second USB drive (USB 2) 112. The column 210 represents the number assigned to each drive as they were originally linked in the INT 13 chain. As depicted, these are assigned from top to bottom as 80, 81, 82, 83 and 84. The swizzle table 204 provides a translation interface between the BCV list 202 and the operating system 206. Column 210 is the link number assignments according to the BCV list 202, and column 220 represents a re-assignment of those link numbers that are then presented to the operating system 206. As depicted, HARD DRIVE 3 118 has been selected by the user to be the boot device. Thus, the number assignments for the boot devices as seen by the operating system are translated from those numbers as originally linked. HARD DRIVE 3 118 now becomes number 80; HARD DRIVE 1 114 now becomes number 81; and HARD DRIVE 2 116 now becomes number 82. This translation of the number assignments satisfies PC system requirements and provides increased configurability to allow for user selection of boot devices.

FIG. 3 is a flow diagram of an embodiment 300 for drive number swizzling as part of handling a single BBS list according to the present invention. Flow starts in block 302 where a new BBS list is built. Next, in block 304, the BCV devices (BCVs) are linked and assigned numbers, such as that shown in column 210 of the BCV list 202 in FIG. 2B. In block 306, the selected BBS device is attempted for system boot. In decision block 308, a determination is made whether or not the BBS device is a BCV device. If "no," boot system block 312 is reached. If "yes," the drive swizzler routine is run in block 310. This routine re-assigns link numbers, as needed, so that the current BBS device is assigned link number "80." In decision block 314, a determination is made whether or not the boot was successful. If "yes," then STOP block 316 is reached. If "no," then the next BBS device is selected in block 318, and then flow passes back to block 306 where the newly selected BBS device is booted.

Figure 4A:
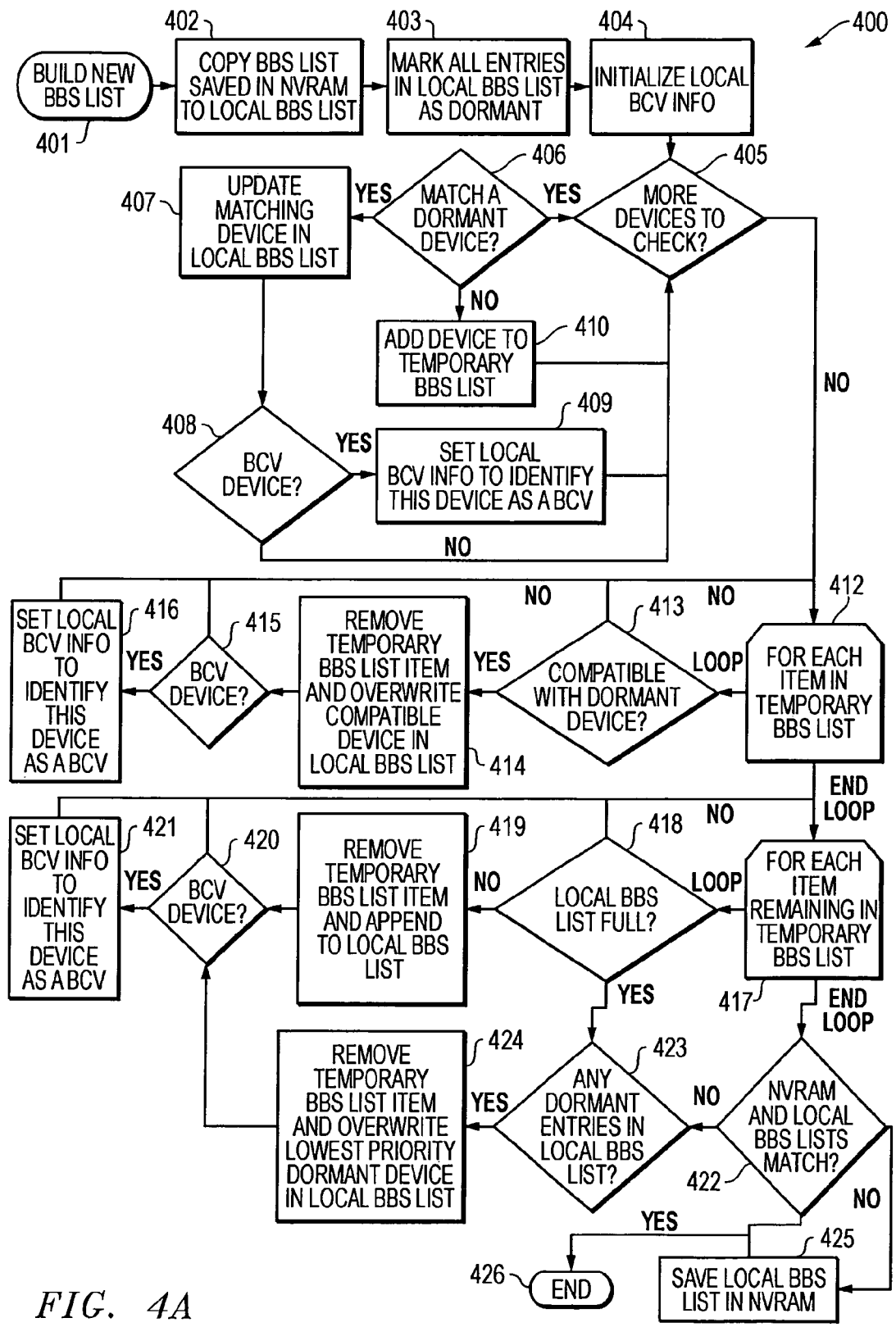
FIGS. 4A-4D are a more detailed flow diagrams for a boot up process according to the present invention, including BBS list build process, a BCV link process, BBS device boot process, and a INT 13 drive swizzler process, respectively.
Figure 4B:
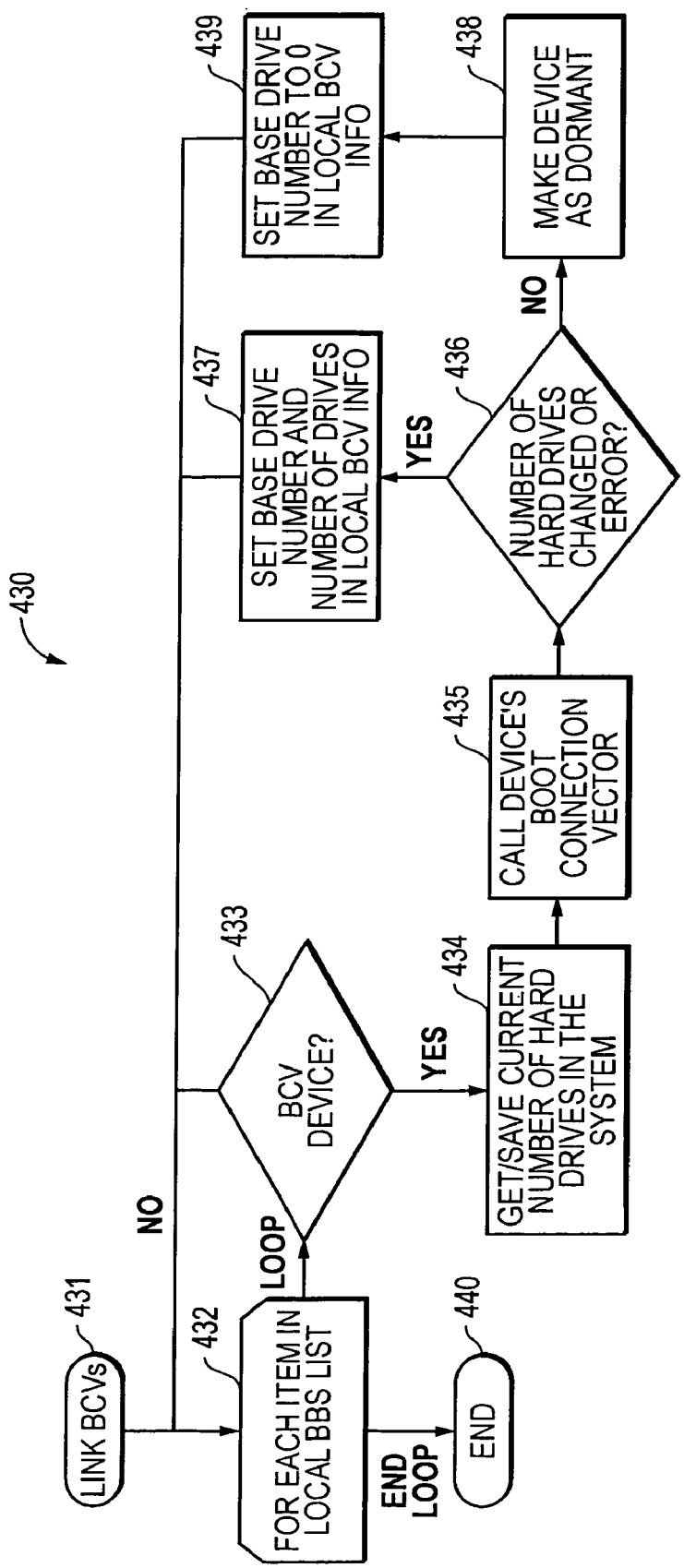
Figure 4C:
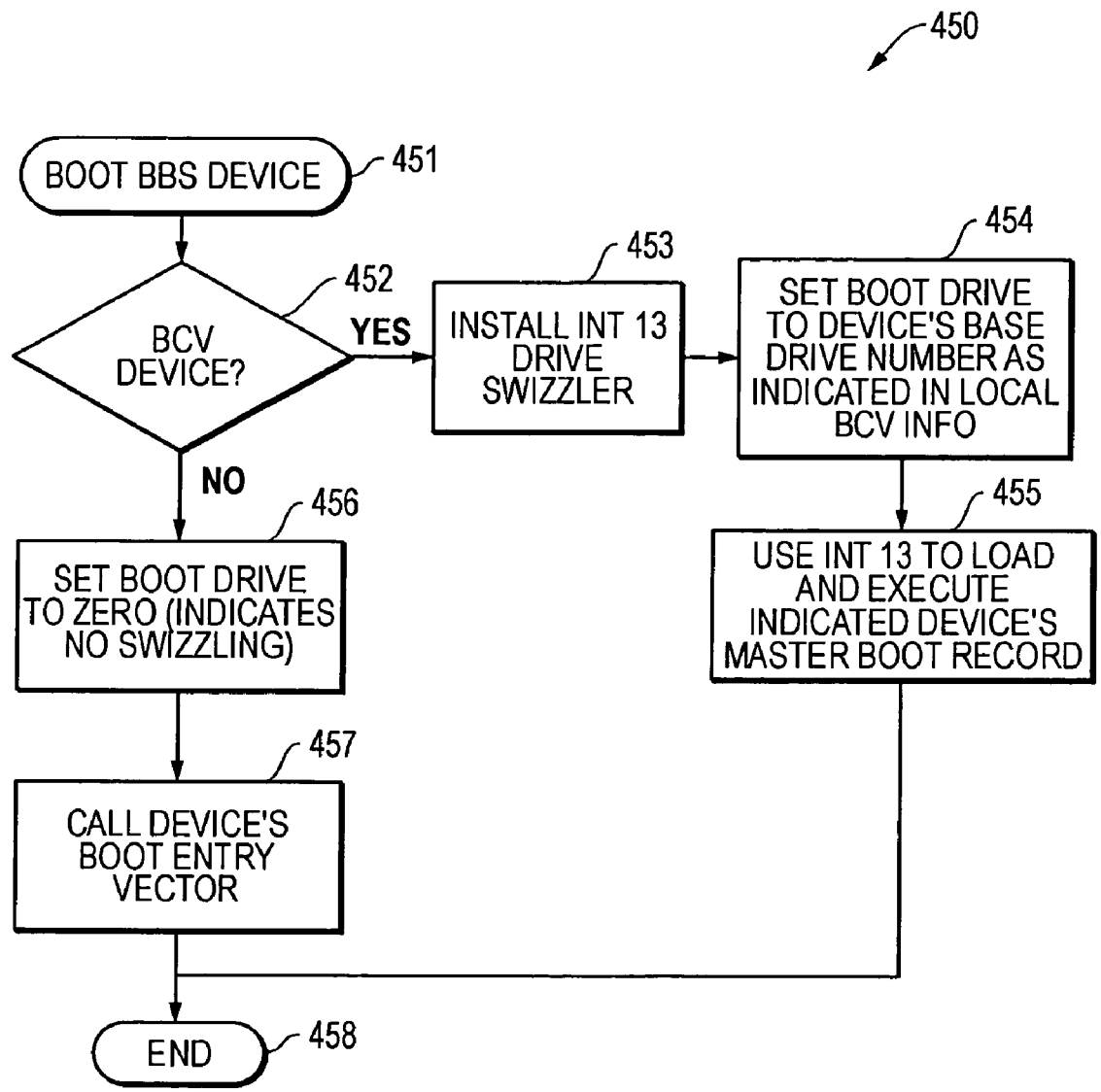
Figure 4D:
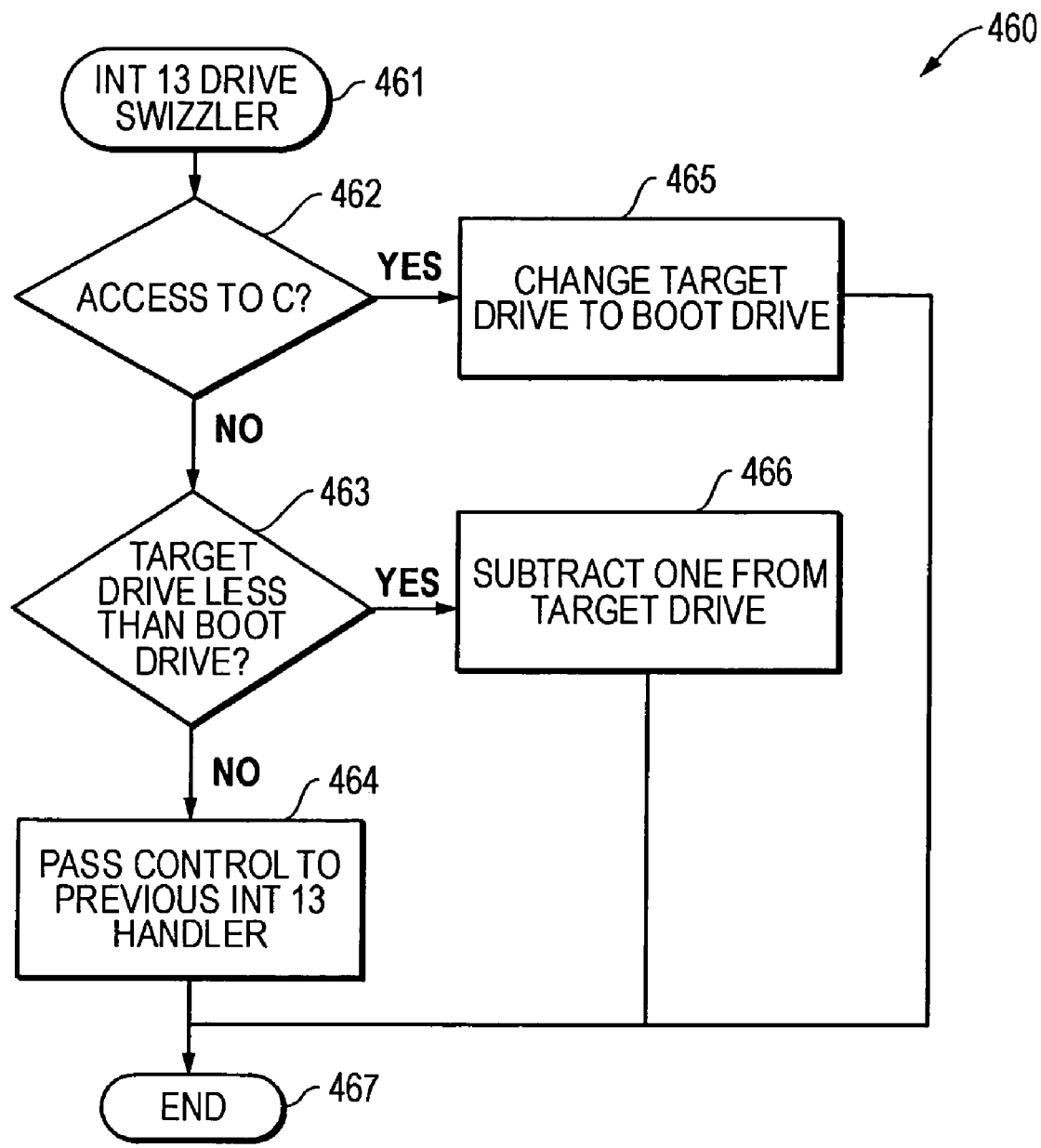
Figure 5A:
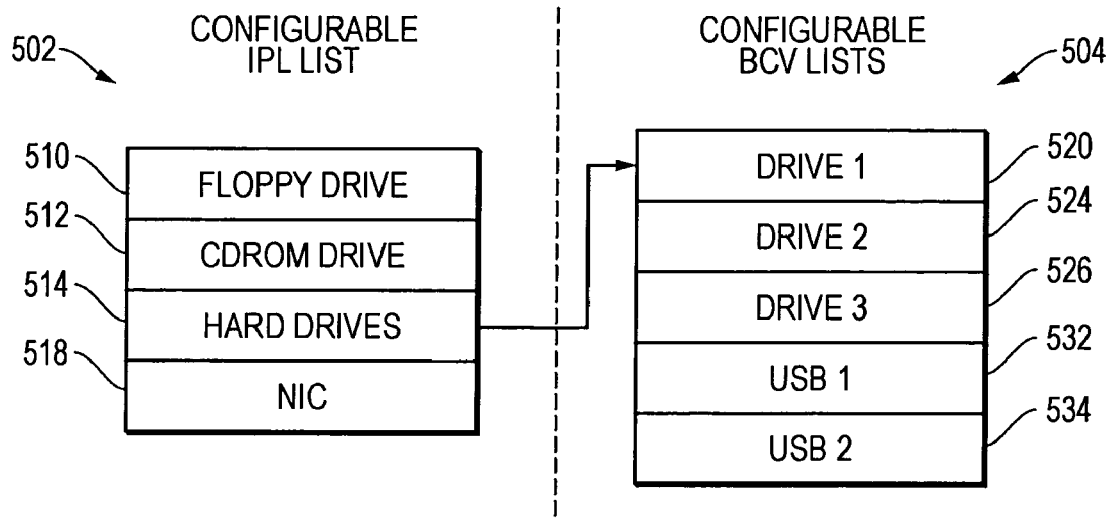
FIG. 5A (prior art) is a block diagram for a two-list BBS implementation including an IPL list and a BCV list as used in prior systems.
Figure 5B:
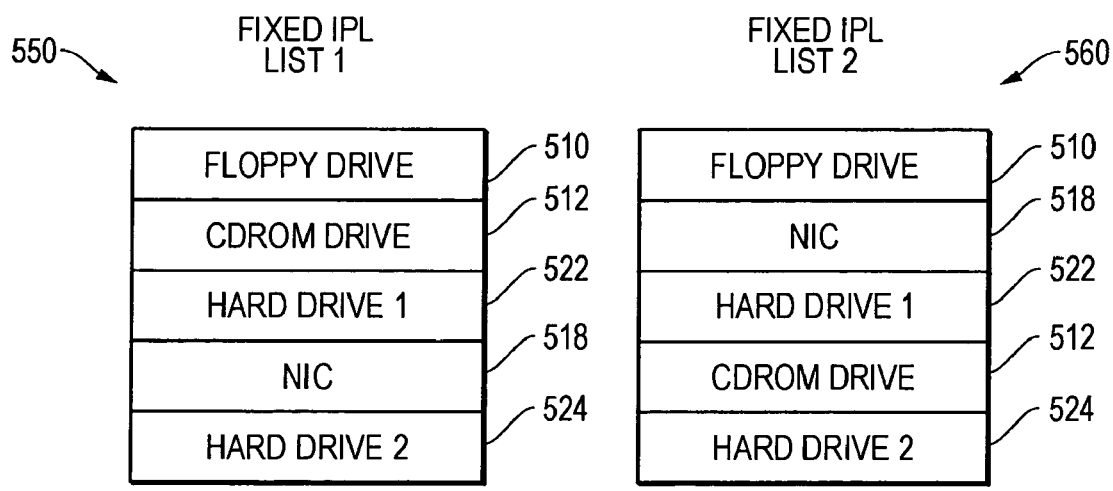
FIG. 5B (prior art) is a block diagram for fixed IPL lists as used in prior systems having limited configuration options.

FIGS. 4A-4D are now discussed. FIG. 4A provides an example flow diagram for building a new BBS list. FIG. 4B provides a flow diagram for linking BCV devices. FIG. 4C provides a flow diagram for booting BBS devices. FIG. 4D provides a flow diagram for the drive swizzler.

Looking first to FIG. 4A, the process flow to build a new BBS list begins with block 401. In block 402, the BBS list that is currently saved in non-volatile random access memory (NVRAM) is then copied to a local BBS list. Next, in block 403, all entries in the local BBS list are marked as "Dormant." In block 404, the local BCV information is then initialized. The local BCV information includes a base drive number and a drive count number. A base drive number of "0" indicates that the device is not a BCV device. In decision block 405, a determination is then made whether more devices exist that need to be checked. If "yes," flow passes to decision block 406, where a determination is made whether the device matches a dormant device. If "no," flow passes to block 410 where the device is added to a temporary BBS list, and then flow passes back to decision block 405. If "yes," flow passes to block 407 where the matching device in the local BBS list is updated, and then to decision block 408 where a determination is made whether the device is a BCV device. If "no," flow passes back to decision block 405. If "yes," flow passes to block 409 where the local BCV information is set to identify this device as a BCV device, and then flow passes back to decision block 405. Once the determination in decision block 405 is "no," flow passes to block 412.

Block 412 begins a loop that is used to process each item in the temporary BBS list. First, for each of these items, a determination is made in decision block 413 whether the item is compatible with a dormant device. If "no," flow passes back to block 412 to then consider the next item. If "yes," flow passes to block 414 where the item is removed from the temporary BBS list and where the compatible device in the local BBS list is overwritten. Flow then passes to decision block 415 where a determination is made whether the device is a BCV device. If "no," flow passes back to block 412 to then consider the next item. If "yes," flow passes to block 416 where the local BCV information is set to identify this device as a BCV device, and then flow passes back to block 412 to then consider the next item. When all items in the temporary BBS list have been processed, the loop ends and flow passes to block 417.

Block 417 begins a loop that is used to further process any remaining items in the temporary BBS list. For each such item, a determination is made in decision block 418 whether the local BBS list is full. If "no," then block 419 is reached where the item is removed from the temporary BBS list and appended to the local BBS list. Decision block 420 is then reached where a determination is made whether the device is a BCV device. If "no," then flow passes back to block 417 to then consider the next item. If "yes," then flow passes to block 421 where the local BCV information is set to identify the device as a BCV device, and then flow passes to block 417 to then consider the next item. If the determination in decision block 418 is "yes," the flow passes to decision block 423 where a determination is made whether there are any dormant entries in the local BBS list. If "yes," the block 424 is reached where the item is removed from the temporary BBS list and used to overwrite the lowest priority dormant device in the local BBS list, and flow then passes to decision block 420. If "no," decision block 422 is reached where a determination is made whether the BBS list in NVRAM matches the local BBS list. If "yes," then the process ends with block 426. If "no," then block 425 is reached where the local BBS list is saved in NVRAM, and then the process ends with block 426. Decision block 422 is also reached if block 417 is reached and there are no remaining items in the temporary BBS list. At such an event, the loop ends and flows passes from block 417 to decision block 422.

FIG. 4B provides a process flow for linking BCV devices. Block 431 begins the BCV device linking process Flow then passes to block 432, which begins a loop that is used to analyze each item in the local BBS list. First, for this loop, decision block 433 is reached where a determination is made whether the device is a BCV device. In other words, the device's base drive number in the local BCV information is checked to see if it is something other than "0." If "no," flow passes back to block 432 to then consider the next item. If "yes," flow passes to block 434 where the current number of hard drives in the system is retrieved from storage, incremented, and saved back to storage. For example, with PC systems, the number of hard drives in the system is stored at memory location 0040:0075. Next, flow passes to block 435 where the devices boot connection vector is called. Among other things, the BCV code in a PC system BIOS looks for any devices and, if none are found, simply returns. Otherwise, the BCV code adds the number of devices found to the number stored at 0040:0075 and then chains INT 13 (interrupt 13). Decision block 436 is then reached where a determination is made whether the number of hard drives has changed and whether an error has occurred. If "no," flow passes to block 438 where the device is made dormant, then to block 439 where the base drive number is set to "0" for that device in the local BCV information, and then to block 432 to consider the next item. If the determination in decision block 436 is "yes," flow passes to block 437 where the base drive number and the number of drives is set in the local BCV information, and then flow passes to block 432 to consider the next item. When there are no more items, the loop ends, and flow passes from block 432 to the END block 440.

FIG. 4C provides a process flow diagram for the boot process for each BBS device. Block 451 begins the boot process for each BBS device. Flow then passes to decision block 452 where a determination is made whether the device is a BCV device. If "no," flow passes to block 456 where the boot drive is set to "0" thereby indicating no swizzling, then flow passes to block 457 wherein the device's boot entry vector is called, and the END block 458 is then reached. If "yes," flow passes to block 453 where the INT 13 drive swizzler is installed. This installation, for example, can include saving the current INT 13 handler address and then overwriting it with the swizzler. Next, flow passes to block 454 where the boot drive is set to the device's base drive number as indicated in the local BCV information. Block 455 is then reached where INT 13 is used to load and execute the device's master boot record. The process then ends with block 458.

FIG. 4D provides a process flow diagram for the INT 13 driver swizzler. Block 461 begins the INT 13 drive swizzler. Flow then passes to decision block 462 where a determination is made whether access exists to "C:" in the system. If "yes," the target drive is changed to the boot drive in block 465, and flow then passes to END block 467. If "no," flow passes to decision block 463 where a determination is made whether the target drive is less than the boot drive. If "yes," flow passes to block 466 where one is subtracted from the target drive, and then flow passes to END block 467. If "no," flow passes to block 464 where control is passes back to the previous INT 13 handler.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

What is claimed is:

1. A method for utilizing a single BIOS boot specification (BBS) list in an information handling system, comprising:
   providing within an information handling system a plurality of bootable BCV (boot connection vector) devices of a first device type and at least one non-BCV device that is an IPL (initial program load) device;
   analyzing each installed bootable device in the information handling system during system boot to identify each device as a BCV device or as a non-BCV device;
   for each BCV device, determining a number of drives supported by that BCV device and placing the BCV device within a BCV link;
   forming a single BBS list including BCV devices and non-BCV devices such that a separate BBS list entry is included for each of the plurality of BCV devices of the first type and for the at least one non-BCV device;
   booting the system according to a device order set forth in the single BBS list; and
   if a current boot device is a BCV device, utilizing a drive swizzler as needed to control a link designation for the boot device to make the boot device appear to be a first device in the BCV link to an operating system for the system.

2. The method of claim 1, further comprising providing within the information handling system at least one additional bootable BCV device of a second device type.

3. The method of claim 2, further comprising allowing a user to configure an order of entries within the single BBS list such that the BCV device of the second device type can fall between the entries in the BBS list for the BCV devices of the first device type.

4. The method of claim 3, wherein the first device type is hard drives.

5. The method of claim 1, further comprising utilizing and interrupt chain to link BCV devices.

6. The method of claim 5, wherein the interrupt chain is an INT 13 chain and wherein the drive swizzler makes sure that the current boot device appears to be drive 80 to the operating system.

7. The method of claim 1, further comprising retrieving a prior BBS list from non-volatile memory and using this prior BBS list in analyzing the installed bootable devices.

8. The method of claim 1, further comprising installing the drive swizzler when a bootable BCV device is the current boot device and uninstalling the drive swizzler after boot is attempted using the BCV device regardless of whether or not the boot was successful.

9. An information handling system having a single BIOS boot specification (BBS) list, comprising:
   a central processing unit (CPU);
   a plurality of bootable devices including a plurality of bootable BCV (boot connection vector) devices of a first device type and at least one non-BCV device that is an IPL (initial program load) device; and
   a BIOS in communication with the CPU and the plurality of bootable devices, the BIOS being configured to operate during initialization of the information handling system to:
      analyze each of the installed bootable devices during system boot to identify each device as a BCV device or as a non-BCV device;
      for each BCV device, determine a number of drives supported by that BCV device and place the BCV device within a BCV link;
      form a single BBS list including BCV devices and non-BCV devices such that a separate BBS list entry is included for each of the plurality of BCV devices of the first type and for the at least one non-BCV device;
      boot the system according to a device order set forth in the single BBS list; and
      if a current boot device is a BCV device, utilize a drive swizzler as needed to control a link designation for the boot device to make the boot device appear to be a first device in the BCV link to an operating system for the system.

10. The information handling system of claim 9, wherein the plurality of bootable devices comprise at least one additional bootable BCV device of a second device type.

11. The information handling system of claim 10, wherein the entry in the BBS list for the BCV device of the second device type falls between the entries in the BBS list for the BCV devices of the first device type.

12. The information handling system of claim 11, wherein the first device type is hard drives.

13. The information handling system of claim 9, further comprising a non-volatile memory configured to store a prior BBS list and wherein the BIOS being configured to use this prior BBS list in analyzing the installed bootable devices.

14. The information handling system of claim 9, wherein the BIOS is further configured to install the drive swizzler when a bootable BCV device is the current boot device and uninstall the drive swizzler after boot is attempted using the BCV device regardless of whether or not the boot was successful.

15. A BIOS (basic input output system) for an information handling system including a boot process routine, comprising:
   a BIOS boot specification (BBS) list build process configured to analyze each of the installed bootable devices during system boot to identify each device as a BCV (boot connection vector) device or as a non-BCV device within a single BBS list such that when a plurality of bootable BCV devices of a first type and at least one non-BCV device that is an IPL (initial program load) device are present, a separate BBS list entry is created for each of the plurality of BCV devices of the first type and for the at least one non-BCV device;

a BCV link process configured to determine for each BCV device a number of drives supported by that BCV device and to place the BCV device within a BCV link; and a device boot process configured to boot the system according to a device order set forth in the single BBS list, and if a current boot device is a BCV device, to utilize a drive swizzler as needed to control a link designation for the boot device to make the boot device appear to be a first device in the BCV link to an operating system for the system.

16. The BIOS for an information handling system of claim 15, wherein the single BBS list comprises at least one additional bootable BCV device of a second device type.

17. The BIOS for an information handling system of claim 16, wherein the entry in the BBS list for the BCV device of the second device type falls between the entries in the BBS list for the BCV devices of the first device type.

18. The BIOS for an information handling system of claim 15, wherein the BBS build process is further configured to utilize a prior BBS list in analyzing the installed bootable devices.

* * * * *